Feb. 1, 1938.   K. J. SOULE   2,106,817
SEALING GASKET
Filed April 12, 1935

Inventor:
Kenneth J. Soule,
By Lee J. Gary
Attorney.

Patented Feb. 1, 1938

2,106,817

UNITED STATES PATENT OFFICE 2,106,817

SEALING GASKET

Kenneth J. Soule, Ridgewood, N. J., assignor to Raybestos-Manhattan, Inc., Passaic, N. J., a corporation of New Jersey Application April 12, 1935, Serial No. 15,970

4 Claims. (Cl. 288—1)

This invention relates to improvements in sealing gaskets employed in the union of contiguous sections of containers, casings or conduits, and has more particular reference to improvements in sealing gaskets of the relatively flexible type.

More specifically, the invention is directed to improvements in gasket elements employed in sealing sections of containers utilized in housing electrical elements, such as transformers or the like, within which containers a body of insulating fluid, such as oil, is confined and the electrical element immersed.

It is essential, if impairment in electrical transformer efficiency is to be minimized and prevented, that the body of oil in which the transformer is immersed, be maintained in relatively uncontaminated state at all times. Usually, the presence of but a relatively small amount of foreign matter in such oil deleteriously affects and materially impairs the efficiency of the transformer. The housing or casing for the immersing oil and transformer is usually manufactured from light-weight, pressed steel material, suitably sectioned and flanged to afford subsequent contiguous union of the facings of the flanges to produce the unitary housing. The character of this material is such that it is impossible to procure a uniform, even surface of flange facing, so that an adequate liquid or air-tight union of the sections may be effected on assembly. In order to obtain this desired and requisite sealing effect between the casing sections on union of the flange facings thereof, as well as to compensate for any lack of uniformity or regularity in the surfaces of such facings, a relatively flexible gasket element, usually of rubber or a compound thereof, is interposed between the flange facings of such sections and held in secured relation therebetween. Forming a component part of the casing or container, the internal portion or edges of the rubber gasket are in proximity to and directly contact with the oil body maintained within such casing or container. The oil has a deleterious action upon the rubber gasket, causing the exposed edge portions thereof to swell, disintegrate and slough off, not only dissipating the effectiveness of the gasket as a sealing medium, but contaminating the oil body itself, thereby impairing or eliminating the functions of both oil and gasket. This deleterious action of oil toward gasket is particularly pronounced and aggravated in instances where a so-called non-inflammable, or chlorinated oil is employed as the insulating medium within the casing.

It has been found that if the rubberized gasket element is maintained in confined state and means employed in conjunction therewith which will effectively prevent deleterious attack upon the rubber thereof by the insulating oil body, swelling and distention of such gasket, inducing consequent disintegration and sloughing off of the same will be remedied, while at the same time objectionable contamination of the oil body will be effectively prevented.

It is among the objects of the present invention, therefore, to provide a composite gasket element adapted for employment between contiguous sections of containers housing electrical transformers, and of a character such that it is not amenable to attack and disintegration due to its proximity with the insulating oil body maintained within said housing, nor possesses the objectionable property of contaminating or impairing the function of such insulating oil body.

Other and further objects and advantages of the invention will become apparent from the following detailed description thereof, as well as from the accompanying drawing, wherein for purposes of illustration,—

Figure 1:
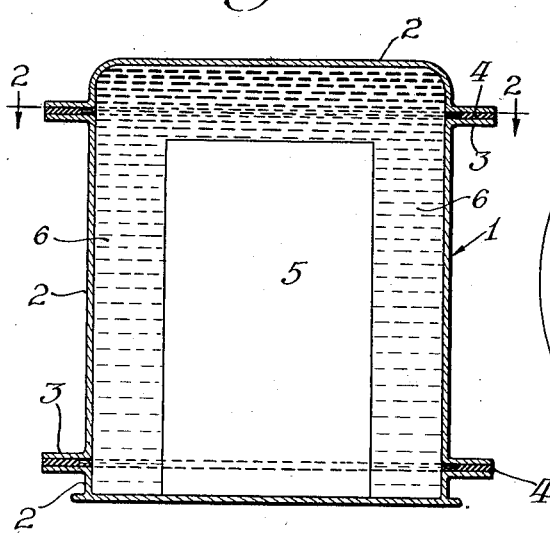
Fig. 1 is a sectional, side-elevational view of a conventional form of transformer casing in which the gasket element of the present invention is shown in use in one applied form.

Referring to the drawing, and more particularly to Fig. 1 thereof, a conventional metal transformer housing or casing 1 is shown, comprising a plurality of section members 2 adapted to be retained in secured relationship to make up the unitary casing 1 by means of bolts or other securing means (not shown) accommodated by the extending facing flanges 3 integrally formed on each of the sections 2. To effectively seal and provide an air and liquid tight union of the oppositely opposed facings of flanges 3 on assembly of the section members 2, a flexible gasket element of the section members 2, a flexible gasket element 4, comprising a composite fibrous-rubber material to be hereinafter more particularly described, is preferably interposed between said facing flanges 3 and retained in operative relation therebetween by means of the pressure exerted upon such facing flanges when the sections 2 are retained in secured relationship. Internally mounted or otherwise secured within the casing 1 is a conventional electrical transformer, comprising the usual core and winding (not shown), but diagrammatically illustrated at 5. The transformer element 5 is preferably surrounded by and completely immersed in a body of insulating fluid 6, such as any well-known type of transformer oil.

Figure 2:
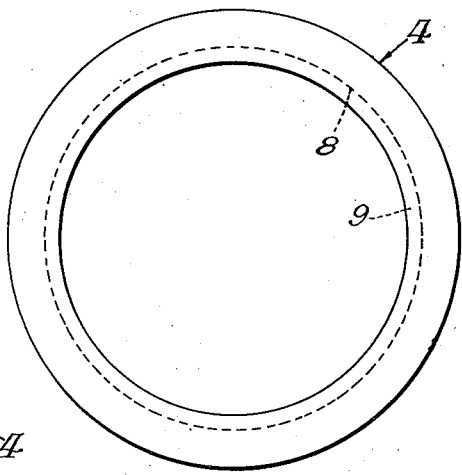
Fig. 2 is a top plan view of a form of gasket element of the present invention.
Figure 3:
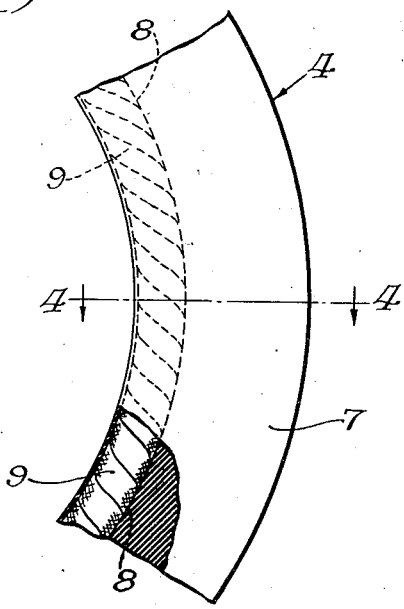
Fig. 3 is a fragmentary view of the gasket shown in Fig. 2, with parts broken away to illustrate the composite structure thereof.
Figure 4:
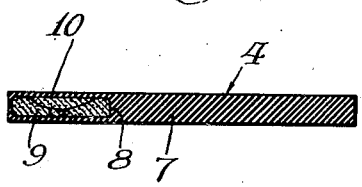
Fig. 4 is a sectional view, taken on a line 4—4 of Fig. 3.

Referring more particularly now to the flexible gasket element 4, and to Figs. 2, 3 and 4 of the drawing, showing an adaptable form thereof, said gasket preferably comprises a relatively thin, flat outer peripheral main portion 7 of soft seal rubber or similar flexible material functioning as an effective seal between joined elements. In order to afford an adequate protective means for said rubber portion 7 and effectively prevent its contact with an insulating or other type of rubber-attacking fluid when said gasket is in use and thereby induce its disintegration and cause contamination of said insulating fluid, there may be integrally formed or fabricated on said main rubber portion 7 by securing or bonding to its internal peripheral edges 8, a fibrous material portion 9, of jute, hemp, flax or the like. The fibrous portion 9 of said gasket is preferably braided, plaited, twisted or otherwise fabricated and pressed or shaped to provide a relatively thin, flat structure, in thickness slightly less, preferably, than the thickness of the flat rubber portion 7. In this manner, a composite fibrous-rubber gasket 4 of unitary nature is provided, the fibrous portion 9 of which forms and constitutes the entire inner peripheral edge of the same to afford a protective means for the rubber portion 7 thereof when said gasket is assembled in use.

In bonding and securing the adjacent contiguous edges 8 of the outer peripheral main rubber portion 7 with the fibrous inner portion 9, the latter is preferably coated with a relatively thin continuation layer of rubber 10, to the extent only that such coating layer becomes integrated into the outer exposed fibres of said fibrous material 9 to form a bonding layer 10 which in character and depth is more or less minute. In the drawing, however, such bonding layer 10 is shown in more pronounced degree, but it is to be understood that such showing is merely for purposes of exemplification and clarity. Through this method of bonding, an effective securing and retention of the inner peripheral fibrous portion 9 of the annular gasket 4 with its outer peripheral rubber portion 7 is thus afforded and a unitary gasket element is thereby produced.

When the gasket 4 is assembled between the flanged sections 2 of the transformer casing 1, and such flanged sections are securely bolted down in tight relation, pressure is exerted upon both the fibrous portion 9 and the rubber portion 7 of said gasket, whereby both portions are firmly retained in position, and even though a portion of the insulating fluid 5 should seep through the fibrous portion 9 which adjacently contacts such fluid, due to the removal of the rubber portion 7 from said fluid, as well as to the confined state of such rubber portion, swelling or distention thereof is impossible. Consequently, no deleterious attack or disintegration due to contact with a part of the insulating fluid 5 will be had in such rubber portion 7. Furthermore, should any part of the rubber portion 7 be affected as a result of contact with the insulating oil due to seepage, the presence of the fibrous ring 9 forming the internal peripheral portion of the annular gasket 4, effectively guards against and prevents the possibility of any such affected rubber from getting into the insulating oil body to induce its contamination.

In the form of annular gasket 4 illustrated, the outer peripheral rubber portion 7 is shown as of slightly greater width or thickness than the fibrous inner peripheral portion 9. Such form is preferable for the reason that rubber being distortable and not compressible, will flow on the outside extremity of the annular gasket when the section flanges 3 are compressed in secured relation to each other sufficient to seal the fibrous portion 9 of such gasket, thereby providing an effective seal over the entire face or surface of the flanges of such sections, regardless of irregularities in surface facing of flange. While this form is indicated as preferable, it is to be understood that variance therefrom is within contemplation of the principles of the invention. For instance, the fibrous portion 9 may be equal in thickness to the rubber portion 7, and it is conceivable that in some circumstances, such fibrous portion may exceed the thickness of the rubber portion. Again, the outer peripheral rubber portion 7 of the gasket 4, because of its sealing function and importance, is usually, and as shown, of greater extent and surface area than the inner fibrous portion 9 thereof. In most instances and under normal conditions, this type of gasket will be employed. While the form illustrated will be the type ordinarily employed, it is to be understood that due variance therefrom may be had and that instances may occur where it may be preferable to vary the relative surface areas of the fibrous and rubber portions of such gasket with respect to each other, so that the fibrous portion area may be equal to that of the rubber, or the latter less than the fibrous.

It is to be understood also that while it is preferable in the present invention to employ as the fibrous material 9, jute, hemp or flax of braided or other construction, it is within the concept and contemplation of the invention to employ in lieu thereof other materials, such as cotton, wool, or like fabric material. In the latter instances, these materials may be employed either in the form of a braid or of woven fabric, or, if desired, may be in the form of yarn or roving.

While the invention has been described and illustrated as showing a gasket annular in form, it is to be understood, of course other shapes and forms may be employed, such as square, oblong, et cetera.

It is to be understood that I may use rubber or rubber substitutes and that the term rubber is intended to include all rubber substitutes such as the material commercially known as Duprene, chloroprene, thiokol, modified glyptols, and the like.

I claim as my invention:—

1. A unitary gasket element, comprising a flexible body confined within two perimetric lines, the portion of said body adjacent its outer extremity being of relatively soft sealing material and having a homogeneous transverse section, while the portion of said body adjacent its inner extremity is substantially entirely of fibrous material.

2. A unitary gasket element, comprising a relatively flat, thin, flexible body confined within two perimetric lines, the portion of said body adjacent its outer extremity being of rubber material, while the portion of said body forming its inner extremity is of braided fibrous material and of substantially homogeneous section.

3. A flexible, unitary gasket element of annular form, comprising in combination, a relatively thin, flat rubber body portion of uniform transverse section constituting the entire outer peripheral portion of said element, and an integrally secured, relatively thin, flat fibrous portion of substantially uniform transverse section constituting substantially the entire internal peripheral portion of said element, the rubber body portion of said element being in width and extent in excess of the width and extent of said fibrous portion.

4. A unitary, annular gasket, comprising an outer peripheral portion of rubber material, and an inner peripheral portion of substantially entirely fibrous material bonded thereto.

KENNETH J. SOULE.